United States Patent

[11] 3,570,685

[72] Inventor Kenneth G. Carlson
    11350 North Valley Drive 18 W., Mequon, Wis. 53092
[21] Appl. No. 817,529
[22] Filed Apr. 18, 1969
[45] Patented Mar. 16, 1971

[54] APPARATUS FOR LOADING CANS ON A PALLET
    12 Claims, 13 Drawing Figs.
[52] U.S. Cl. ..................................................... 214/6
[51] Int. Cl. ................................................... B65g 57/10
[50] Field of Search .......................................... 214/6, 6
    (P), 6 (G), 6 (H), 6 (K), 6 (FS), 6 (A), 6 (M), 6 (N)

[56] References Cited
    UNITED STATES PATENTS

| | | | |
|---|---|---|---|
| 2,847,109 | 8/1958 | Gauthier et al. | 214/6(M)X |
| 2,883,074 | 4/1959 | Boehl et al. | 214/6(P) |
| 2,928,559 | 3/1960 | Mosely | 214/6(H) |
| 2,949,179 | 8/1960 | Busse | 214/6(N)X |
| 3,027,020 | 3/1962 | McCoy | 214/6(K) |
| 3,142,389 | 7/1964 | Bolt | 214/6(P) |
| 3,346,128 | 10/1967 | Hullhorst | 214/6(K) |
| 3,420,385 | 1/1969 | Verrinder | 214/6(P) |
| 3,442,401 | 5/1969 | Wolfe et al. | 214/6(P) |

FOREIGN PATENTS

| | | | |
|---|---|---|---|
| 1,108,145 | 5/1961 | Germany | 214/6(G) |

Primary Examiner—Gerald M. Forlenza
Assistant Examiner—Robert J. Spar
Attorney—Wheeler, House & Wheeler ABSTRACT: Disclosed herein is apparatus and a method for forming a rectangular pattern of quantities of cylindrical containers of various sizes and depositing the patterned containers on a pallet and includes a transport conveyor, a retractable apron at the forward end of the conveyor for receiving and depositing patterned containers onto a pallet carried by a fork lift, a horizontally reciprocal gate which is movable over the apron and over the forward end of the conveyor, and which carries a pattern forming element. The apparatus is also provided with a vertically reciprocal clamping bar and includes adjustable side rails along the edges of the conveyor which cooperate with the pattern forming element to form a predetermined pattern of containers on the conveyor. The horizontal gate is also used to sweep layers of cans from filled pallets onto the conveyor when the apparatus is used for depalletizing.

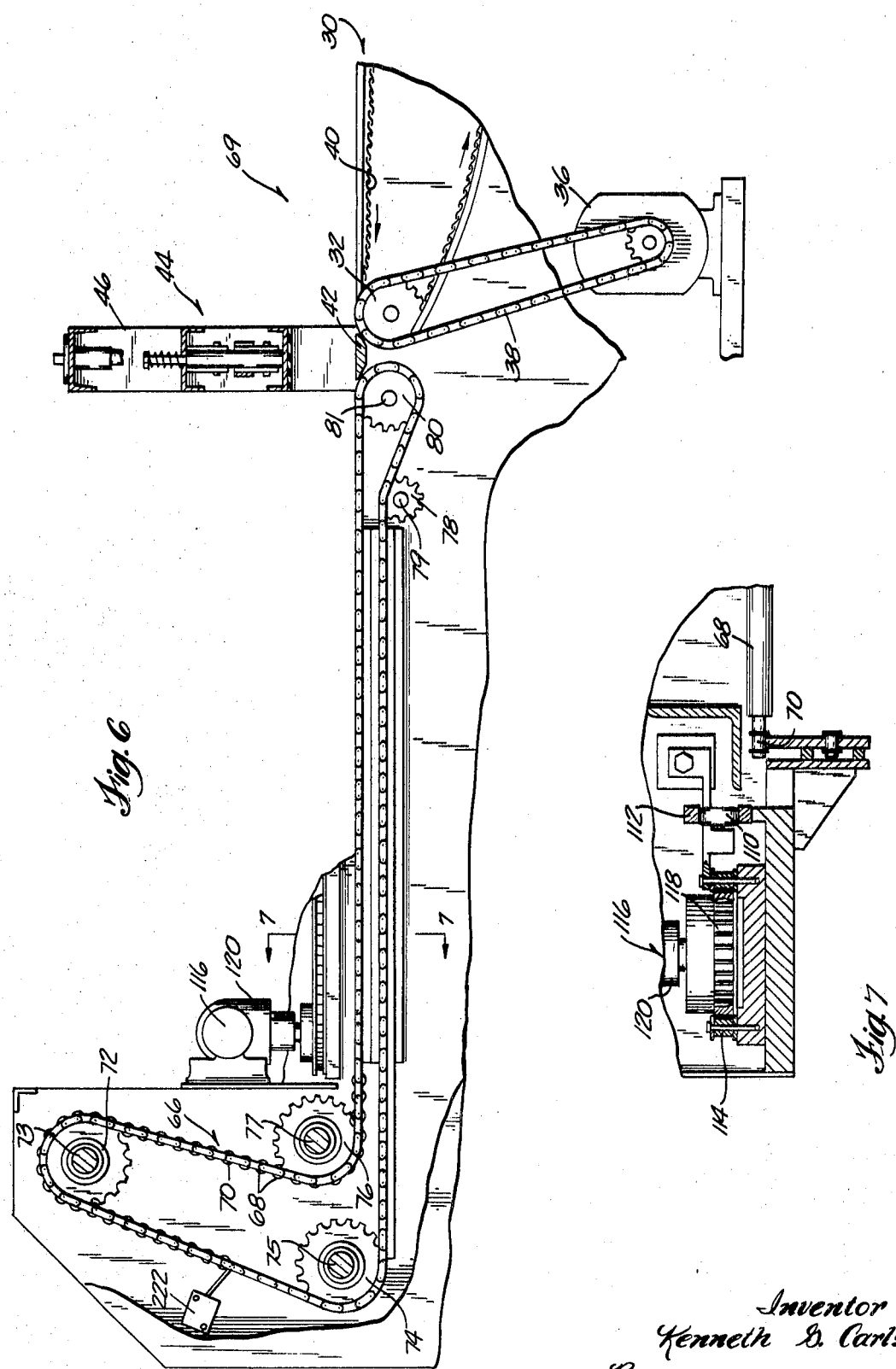

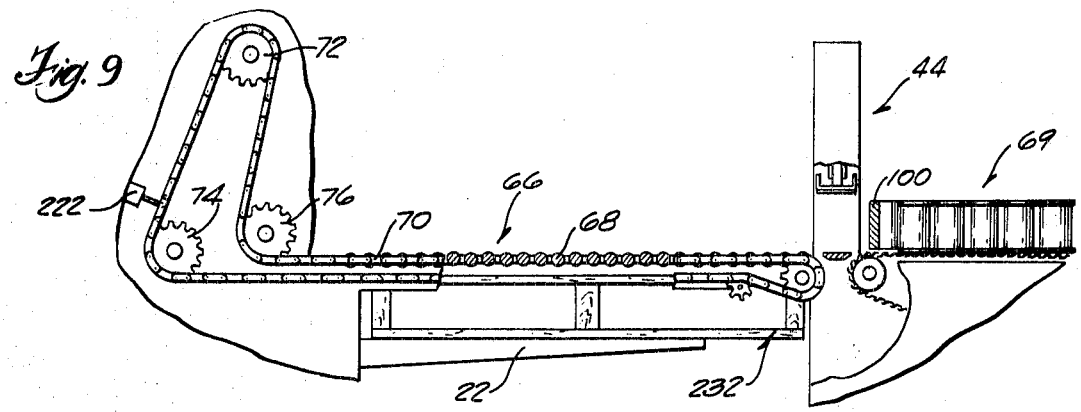
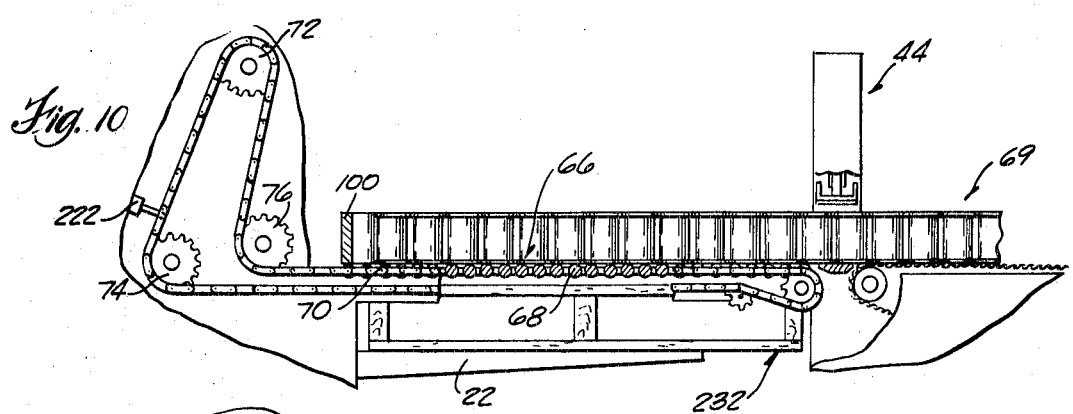
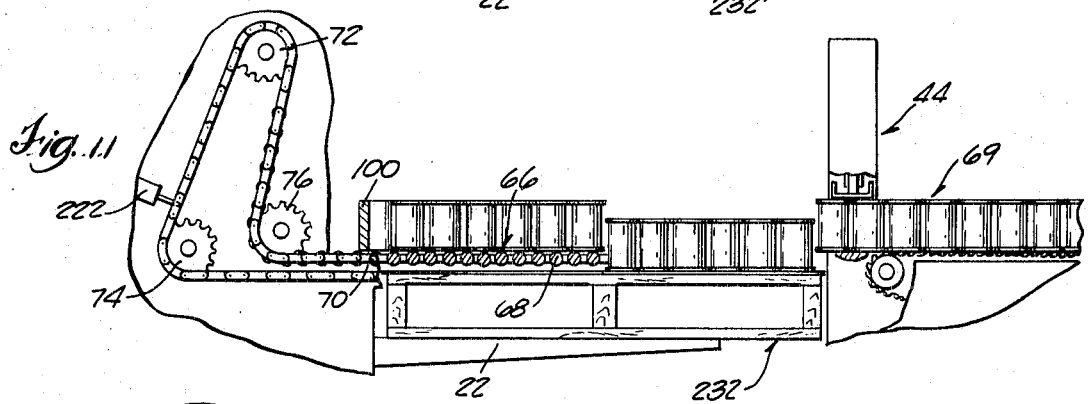
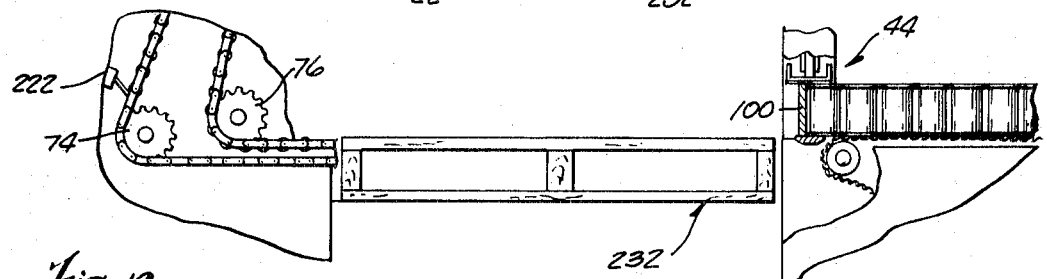

APPARATUS FOR LOADING CANS ON A PALLET

BACKGROUND OF THE INVENTION

The present invention relates to a method and apparatus for arranging cylindrical containers such as filled cans in a compact pattern and for depositing layers of the patterned containers on pallets. It is desirable to form cylindrical containers or cans into tight, compact patterns for the purpose of shipping the cans. Various machines and apparatus have been developed in the art to accomplish these objectives. Some prior art apparatus uses dividers to separate a random arrangement of moving containers into adjacent lanes to form a pattern of cans. This apparatus has been costly and complex, and is not readily adapted to form patterns of various sized containers or cans without substantial time consuming modifications to a number of components. Furthermore, the space requirements for such prior art apparatus is substantial.

SUMMARY OF INVENTION

The invention provides a method and apparatus of palletizing or depalletizing cylindrical containers. The apparatus includes provision for continuously forming a compact rectangular pattern of rows of cylindrical containers in a pattern forming zone at the forward end of a conveyor belt as the containers are continuously fed onto the conveyor belt. The apparatus also includes provision for measuring a layer of patterned cans from the cans in the pattern forming zone and depositing the measured layer on a pallet carried by a vertically reciprocal lift located in a pallet loading bin at the forward end of the conveyor.

The apparatus is adapted to pattern and palletize containers of different sizes. The capability of the apparatus to pattern various size containers is due in part to the use of two laterally adjustable side rails which are located adjacent the edges or margins of the transport conveyor and form the sides of the pattern forming zone. The forward extent of the pattern forming zone is defined initially when commencing the pattern forming operation by a pattern forming member or element which is carried by a horizontally reciprocal gate which can be positioned over the forward end of the conveyor. The apparatus also includes a vertically reciprocal clamping bar which engages cans located on a dead plate at the forward end of the conveyor to arrest movement of cans due to pressure from the conveyor, to facilitate separation of a measured layer of cans.

The pattern forming element consists of a series of equally spaced dies having the configuration of longitudinal half-sections of a cylinder having a radius equal to the radius of the cans which are to be palletized. The dies are interconnected by a web which is secured to the horizontally reciprocal gate. When initially forming a pattern of cans in the pattern forming zone, the side rails are adjusted by an indexing arrangement so that the gap between the side rails is preset so that a tight, compact honeycomb pattern of cans progressively develops rearwardly as the cans engage the pattern forming element. When the leading cans engage the pattern forming element the cans shift and slide on the mesh conveyor belt to fill the gaps between the dies and also the gap between the side rails.

The apparatus also includes a retractable apron which is in the form of a series of closely spaced tubes connected at their ends to spaced endless chains. The retractable apron is movable or reciprocal along the longitudinal center line of the conveyor between a position enclosing the pallet loading bin mouth and in which an end of the apron is located adjacent the dead plate, and a retracted position in which the belt is lifted vertically at the forward end of the apparatus by sprockets. Retraction of the apron vertically, rather than horizontally or laterally, minimizes the overall size of the apparatus.

Once a sufficient quantity of patterned cans has accumulated in the pattern forming zone between the side rails, a quantity of patterned cans is measured to the approximate width or length of a pallet by moving the horizontal gate forward from the conveyor to a predetermined position defined by a stop, thus permitting the continuously running conveyor to push the patterned cans from the conveyor onto the retractable apron which is located over the loading bin mouth during the measuring sequence. When the retractable apron is filled, the vertically movable clamping bar engages the cans located over the dead plate and prevents continued movement of cans. The apron is then retracted to deposit the measured layer of patterned cans onto the pallet which has been raised to a position just beneath the retractable apron. Deposition of cans from the retractable apron to the pallet in this manner does not disturb the pattern. Successive layers of patterned cans can then be superimposed on the first layer by returning the retractable apron to a bin enclosing position and raising the clamping bar to release a quantity of cans to fill the apron. Since the transport conveyor belt is running continuously, once the initial row of cans is patterned by engagement with the pattern bar the pattern forming operation is continuous and a supply of patterned cans is always available for successive layers without any delay in the palletizing sequence.

When using the apparatus of the invention for depalletizing cans, the retractable apron and the vertical gate are not used. A pallet containing a number of layers of cans is raised by a fork lift which extends into the pallet loading bin so that the top layer of cans is substantially at the same height as the conveyor, which is running in a reverse direction. The horizontal gate is then used as a sweep bar to successively push layers of cans from the pallet onto the conveyor.

It is an object of the invention to provide apparatus which is capable of forming a compact pattern of various sized containers with a minimum of adjustments to the apparatus, and for measuring the patterned cans into layers of the approximate size of a pallet and depositing the measured layers in a superimposed vertical array on a pallet.

It is a further object of the invention to provide apparatus which can be used for both palletizing and depalletizing cylindrical containers which has an overall width slightly larger than the width of a pallet.

It is an additional object of the invention to provide palletizing apparatus which deposits a measured layer of patterned cans on a pallet by retracting an apron formed from a series of tubes connected at their ends to spaced chains.

It is a further object of the invention to provide palletizing apparatus which continuously forms a quantity of containers in a predetermined pattern.

It is a further object of the invention to provide palletizing apparatus which initially utilizes a pattern forming element to commence the formation of a pattern of containers and which subsequently uses patterned containers retained on a conveyor to progressively orient containers into the pattern.

It is an additional object of the invention to provide pallet loading and unloading apparatus in which the pallet lift is located along the longitudinal center line of the transport conveyor and in which a retractable apron is reciprocal along the longitudinal center line of the conveyor and can be withdrawn from its extended position to a position vertically above the conveyor to thus minimize the width and length of the apparatus.

Further objects and advantages of the invention will become apparent from the following disclosure.

DESCRIPTION OF THE DRAWINGS

FIG. 6 is a fragmentary enlarged side elevational view of the apparatus shown in FIG. 1, with portions removed.

FIG. 7 is an enlarged sectional view taken along line 7-7 of FIG. 6.

FIG. 8 is an enlarged perspective view of the side rail adjustment means.

FIG. 9 is a diagrammatic view showing the apparatus during the step of forming the initial pattern of cans.

FIG. 10 is a diagrammatic view similar to FIG. 9 showing the cans being pushed on the retractable apron.

FIG. 11 is a view similar to FIG. 9 showing the cans being deposited on a pallet as the apron is retracted.

FIG. 12 is a view similar to FIG. 9 showing the apparatus in use for depalletizing.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
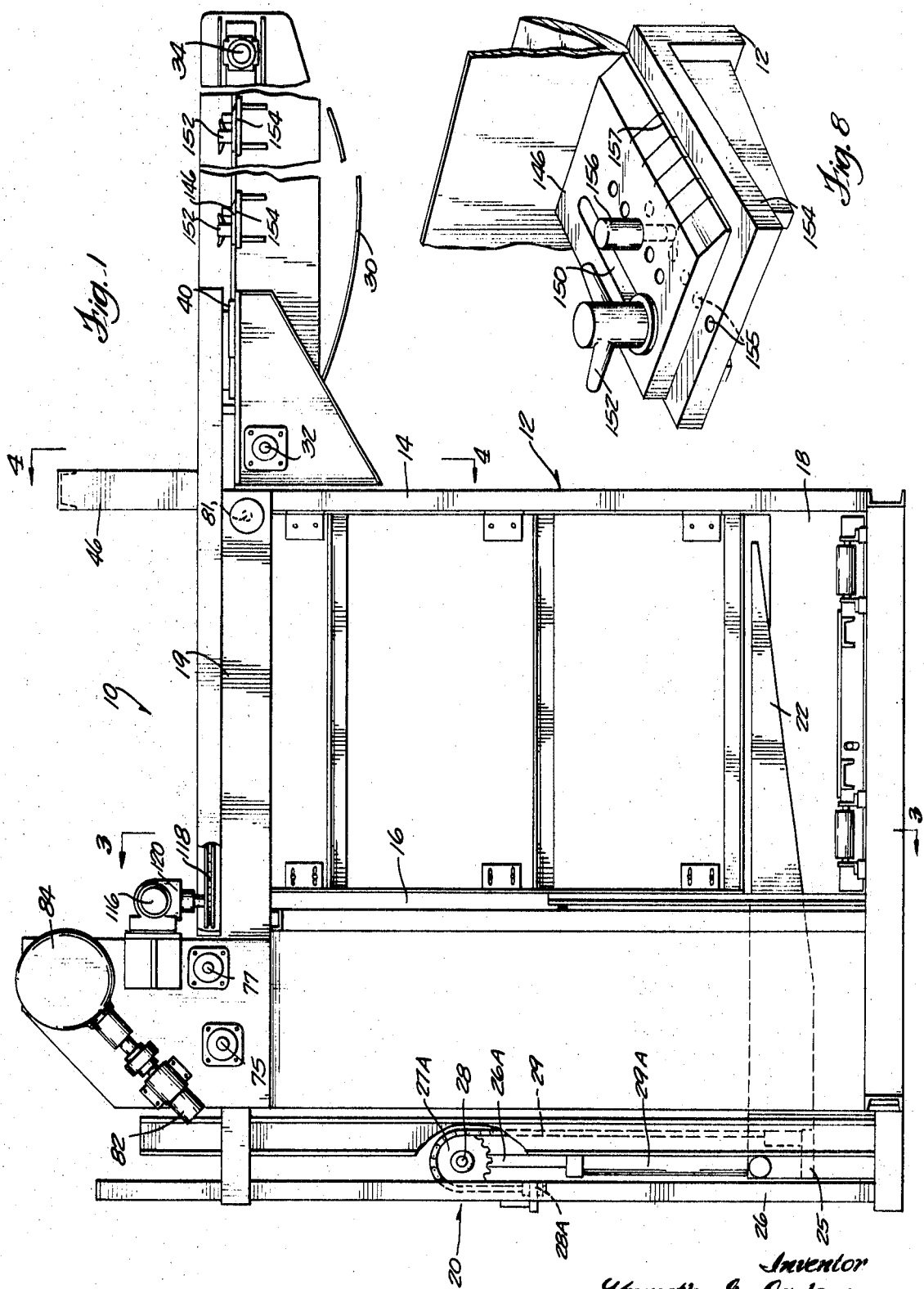
FIG. 1 is a fragmentary side elevational view with portions broken away of apparatus in accordance with the invention.

Referring to FIG. 1, there is shown pallet loading and unloading apparatus in accordance with the invention, which is generally designated 10 and which includes a frame 12. The frame 12 includes a pair of opposite walls 14 and 16 which form in part a pallet loading bin 18 with a bin mouth 19 in which measured layers of patterned cans are loaded on pallets as hereinafter described.

Figure 5:
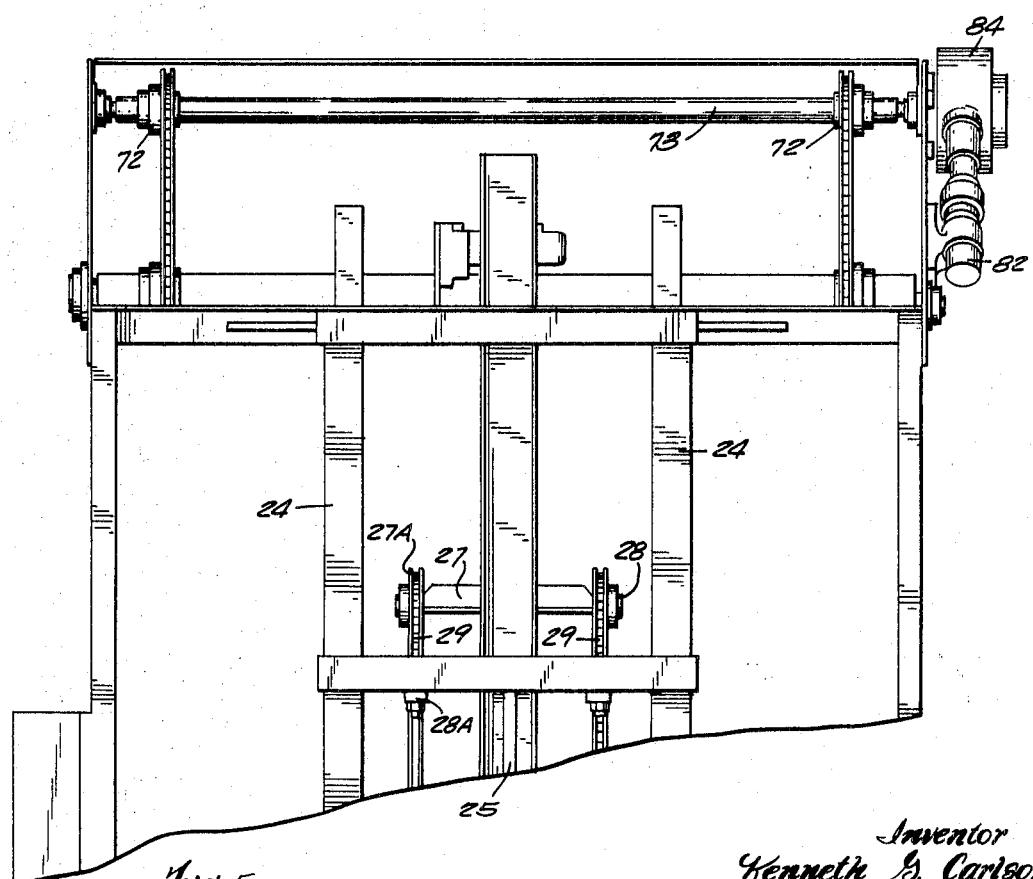
FIG. 5 is a fragmentary rear view of the apparatus shown in FIG. 1.

The apparatus also includes a fork lift 20 which has a fork 22 which extends through slots 22A in wall 16 and into the pallet bin 18. Means are provided to raise and lower the fork 22 within the loading bin 18. As disclosed, the means includes a pair of spaced vertical guide rails 24 (FIG. 5) which are secured to the frame 12. The fork 22 is carried by a fork supporting member 25 which travels along the guide rails 24. The fork supporting member 25 and fork 22 are raised and lowered by an arrangement which includes a shaft supporting member 27 (FIG. 5) which carries a cross shaft 28. The member 27 is connected to the fork supporting member 25 by a pair of spaced chains 29 which have one end secured to the frame 12 at 28A and the other end connected to member 25. Sprockets 27A on shaft 28 are in engagement with the chains 29. The piston rod 26A of a cylinder 29A is connected to the shaft supporting member 27.

The apparatus also includes a conveyor belt 30 (FIG. 1) which is rotatably supported on pulleys or rollers 32 and 34, which are carried by the frame 12. The conveyor belt 20 has a sufficiently low coefficient of friction on its surface to permit the belt to slip under containers carried by the belt during the formation of a pattern as hereinafter described. In the disclosed construction the conveyor belt 30 is constructed of wire mesh. The conveyor belt 30 is driven by a reversible electric motor 36 (FIG. 6) through a chain and sprocket drive 38 connected to drum 32 (FIG. 6). Conveyor 30 has an upper run 40 which travels toward the bin 18. The upper run 40 terminates at a point spaced from the bin 18 and adjacent a dead plate 42 which has a width at least as great as the conveyor 30. The dead plate 42 is connected to the frame 12.

In accordance with the invention, the apparatus includes a vertically reciprocal clamp 44. In the disclosed construction, (FIGS. 1 and 4) the clamp 44 includes a cross frame 46 which straddles the dead plate 42 and which is supported on frame 12. Cross frame 46 carries a cross head 48. The cross head 48 can be vertically adjusted to accommodate different sized cans by a hand crank 50 connected to a threaded shaft 51 which is connected at its lower end to the cross head 48. The shaft 51 can be connected to stud 51A by a chain drive 50A and sprockets 51B. The cross head 48 carries a holddown or clamping bar 52, which is connected to the cross head 48 by three toggle linkages 54. Each toggle linkage 54 includes a first link 56 which has one end pivotally connected to the cross head and the other end pivotally connected to a second link 58. The second link 58 is pivotally connected to the clamping bar 52.

Means are provided for selectively moving the clamping bar 52 between positions of clamping and nonclamping engagement with containers located on said dead plate 42.

Figure 4:
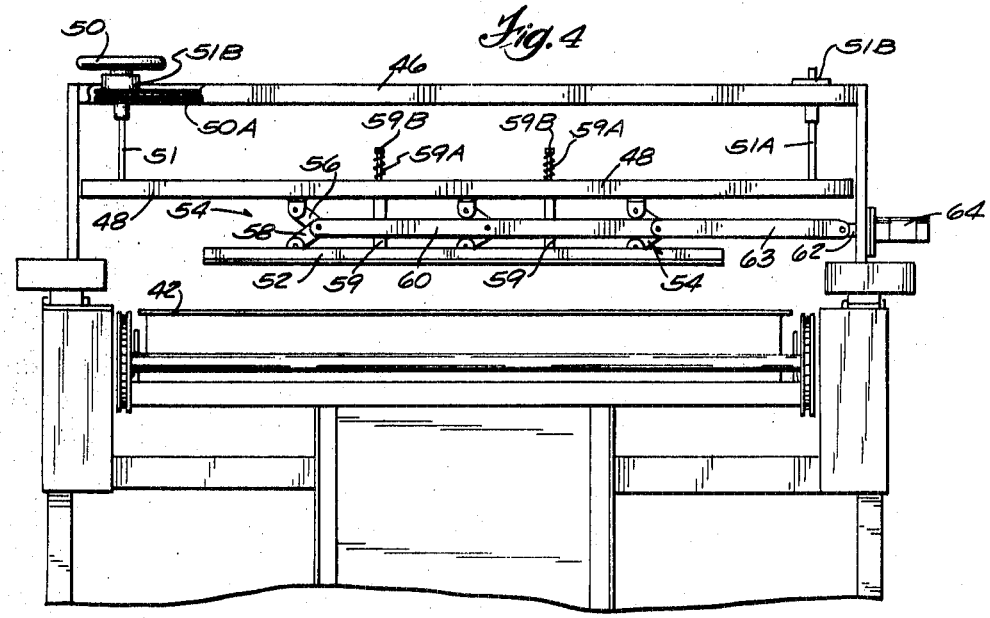
FIG. 4 is a view taken along line 4-4 of FIG. 1.

In the disclosed construction, the means includes a pair of guide pins 59 and springs 59A which are arranged around the pins 59 and located between the pin heads 59B and the cross head 48 to bias the bar 52 to a retracted position as shown in FIG. 4. The lower ends of the pins are connected to the bar 52. The means also includes a push rod 60 which is connected to the connections of the first and second links 56 and 58, and which is connected at one end to a link 63 which is connected to the piston rod 62 of a hydraulic cylinder 64. Overcenter action of the toggle linkages 54 maintains the holddown bar 52 in clamping engagement on the tops of containers. The engagement of the clamping bar 52 on the tops of containers is released by momentary actuation of the hydraulic cylinder 64 as hereinafter described to break or move the toggles 54 from the overcenter position.

In accordance with the invention, a retractable apron or platform 66 is provided to receive a measured quantity of patterned containers from a pattern forming zone 69 on conveyor 30. As shown in FIGS. 6 and 9, the retractable apron 66 comprises a series of transversely extending tubes 68 having a length greater than the width of the conveyor 30. The ends of the tubes 68 are connected to a pair of endless chains 70 which are spaced at a distance slightly greater than the width of a pallet. Each chain 70 is trained around a pair of drive sprockets 72 and pairs of idler sprockets 74, 76, 78 and 80. The sprockets 72 are carried on a cross shaft 73, the sprockets 74 are carried on a cross shaft 75, the sprockets 76 are carried on a cross shaft 77, the sprockets 78 are carried on a cross shaft 79 and the sprockets 80 are carried on the cross shaft 81. The cross shaft 79 and 81 are rotatably supported on frame 12 adjacent the forward end of the conveyor 30. When the retractable apron 66 is in the extended horizontal position shown in FIG. 9, it forms a dock or platform over the mouth 19 of the bin 18 for receiving containers from conveyor 30.

Means are provided for selectively moving the retractable apron 66 from a first position enclosing the mouth 19 of the pallet bin 18 to a second position exposing the mouth 19 and a pallet carried by the fork lift. As disclosed, the means includes a reversible hydraulic motor 82 (FIGS. 1, 2) which is connected to a reducer 84 which is connected to drive sprocket 72. When the apron 66 is retracted the tubes 68 will be withdrawn upwardly around the sprockets 72, 76. Inasmuch as the apron 66 is reciprocal along the longitudinal center line of the conveyor 30 the overall width of the apparatus is only slightly larger than the width of the conveyor 30. Furthermore by raising the chains 70 vertically upward about sprockets 73 the overall length of the apparatus is kept to a minimum.

The invention also provides a horizontally movable gate 100 FIGS. 2 and 9—12) which is provided with means for initiating the formation of a pattern of cans. The means comprises a pattern forming member or element 102. The pattern forming element 102 comprises a series of spaced semicylindrical dies 104 which are connected by a web or plate 105. The dies 104 comprise longitudinal half-sections of cylinders or cans of the size of can being palletized. The members 104 are spaced to afford nesting of the forward rank of cans 106 between the members 104 to form a tight honeycomb can pattern as subsequently described. An appropriate pattern forming element is secured to the pattern forming bar 100 for the size cans being palletized. For instance, when palletizing No. 10 cans, the elements 104 will have a radius equal to the radius of a No. 10 can.

Means are provided for selectively moving the horizontal gate 100 over the retractable apron 66 between a first position over the forward end of the conveyor 30 and a second position adjacent the forward end of the loading bin 18. In the disclosed construction, the means comprises a pair of brackets 108 (FIG 2) which extend from the gate 100. Each bracket 108 is rotatably supported on the frame by a set of trolley wheels 110. The trolley wheels 110 ride in tracks or guides 112 (FIG. 7) which are located on each side of the bin 18.

Figure 2:
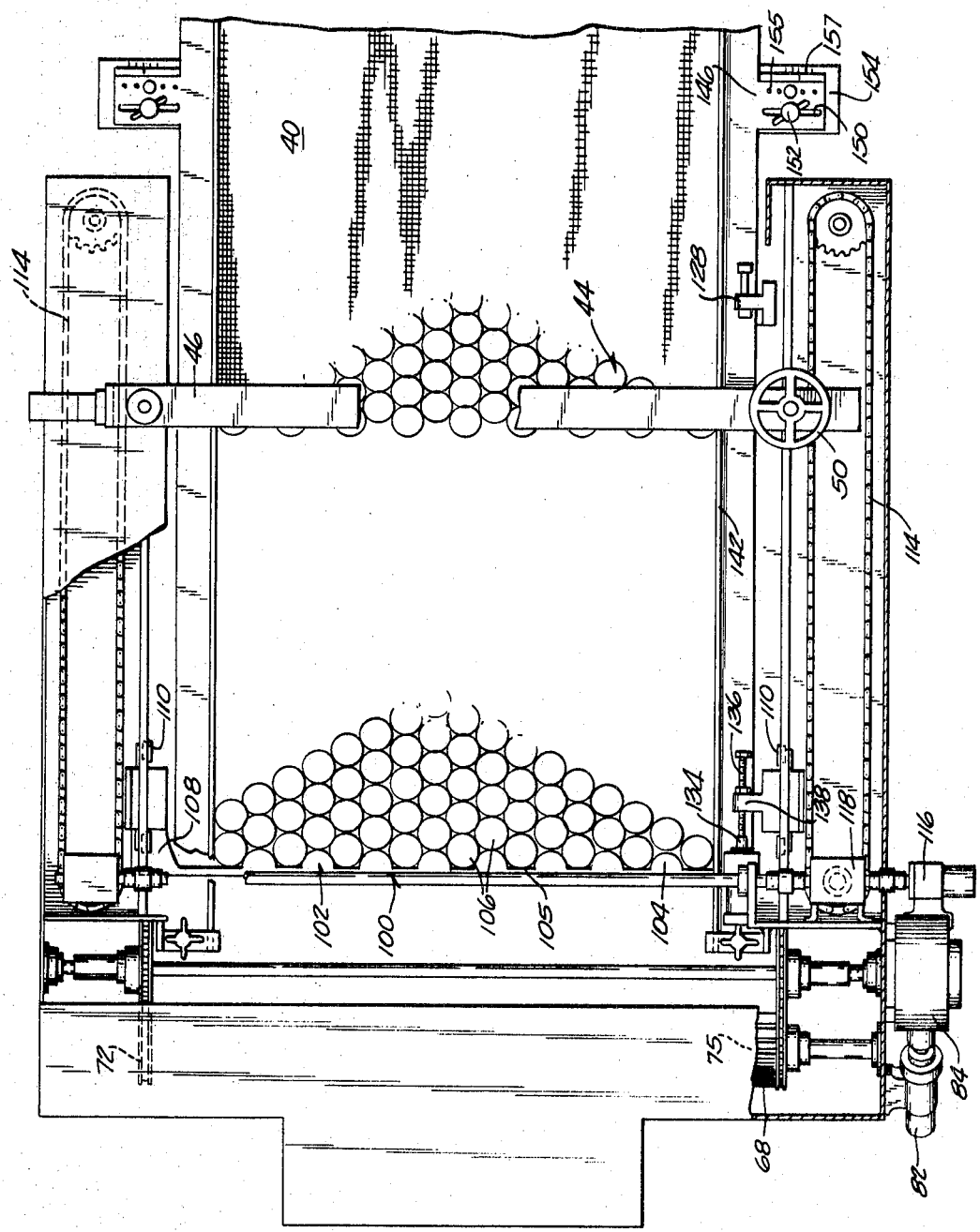
FIG. 2 is a plan view of the apparatus shown in FIG. 1.
Figure 3:
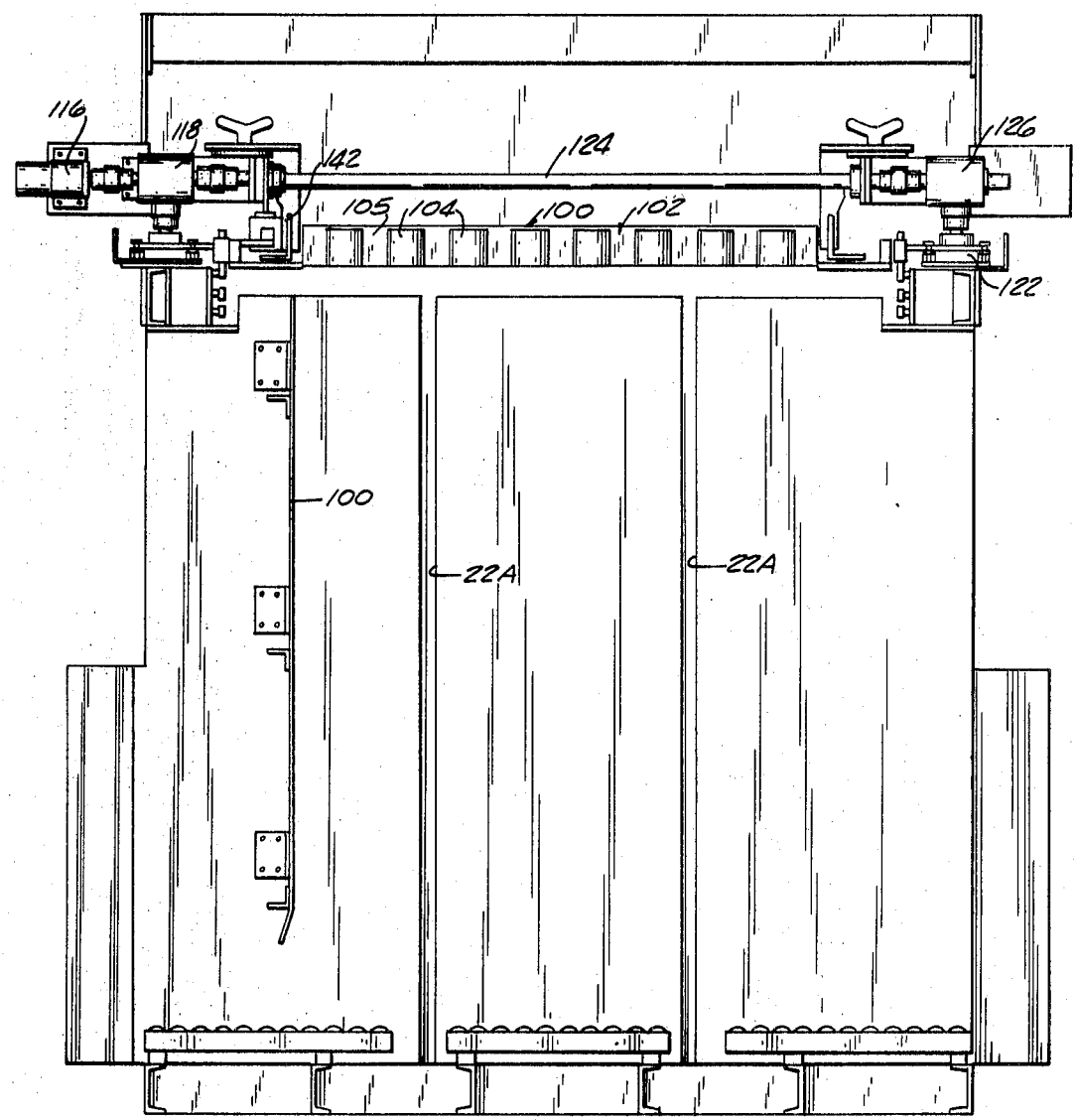
FIG. 3 is a view taken along line 3-3 of FIG. 1.

The means for moving the gate 100 also includes a pair of chains 114 which are located on opposite sides of the bin (FIG. 2), and which travel in a horizontal plane. The spaced chains 114 are connected to the brackets 108. The chains 114 are driven by a reversible hydraulic motor 116 (FIGS. 1 and 2). Motor 116 is connected to a sprocket 118 through a right angle drive 120 (FIG. 6). Hydraulic motor 116 is connected to a sprocket 122 by a cross shaft 124 and a right angle drive 126. Actuation of the hydraulic motor 116 moves the pattern forming bar to and from the various positions shown in FIGS. 9—12 for the purposes hereinafter described.

The first position of the pattern forming bar 100 is determined by an adjustable rear stop 128 which is located adjacent the forward end of the conveyor 30. The second position of the pattern forming bar 100 is determined by a two position forward stop 130 (FIGS. 2, 13) which is in the form of a double acting hydraulic cylinder 132 provided with a piston rod 134. The end of the piston rod 134 engages a screw 136 which is carried by a bracket 138. The hydraulic cylinder 132 includes an adjustment screw 140. The stop 130 facilitates the use of the gate 100 to measure a layer of patterned cans from the pattern forming zone 69 as hereinafter described.

The invention also provides a pair of spaced side rails 142 and 144 (FIG. 2) which extend the length of the conveyor 30 and across the sides of bin 18. Means are provided for adjustably mounting the side rails 142 and 144 on the frame along the side edges or margins of the conveyor 30. The means affords selective lateral adjustment of the side rails to vary the spacing between the side rails 142 and 144. As disclosed, the means comprises out-turned slides 146 and 148 on each of the side rails 142 and 144 (FIG. 8). The slides are provided with longitudinally extending slots 150. The slides 146 and 148 are clamped in place by hand screws 152 which have threaded portions which extend through the slots 150 and are threadably received in frame brackets 154 which are located below the slides 150 to secure the side rails 142 to the frame 12. The slides 148 are provided with index holes 155 and alignment pins 156. The slides 150 and brackets 154 are also provided with indexing graduations or indicia 157 to facilitate adjustment of the side rails when forming patterns for containers of various sizes.

Figure 13:
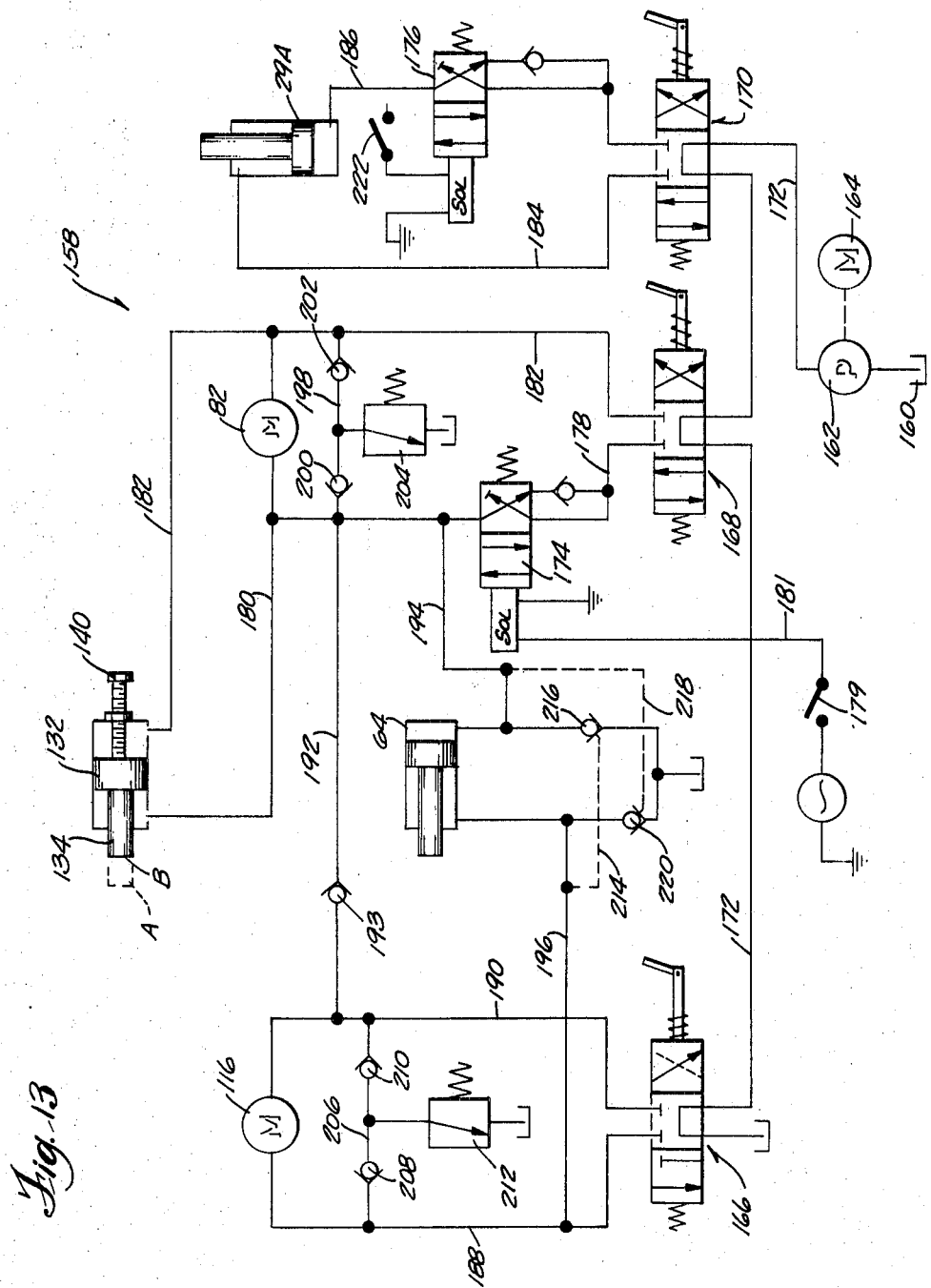
FIG. 13 is a schematic diagram of the hydraulic circuit.

The apparatus of the invention also includes a hydraulic circuit designated generally 158 which is shown in FIG. 13. The hydraulic circuit 158 includes a reservoir 160, a pump 162, and a pump motor 164. The hydraulic pump 162 is connected to three manual values 166, 168 and 170 by a line 172. The valves 166, 168 and 170 have two operative positions and a central "off" position. In addition to the manual valves the hydraulic circuit also includes two solenoid operated valves 174 and 176. Solenoid valve 174 is connected to valve 168 by a line 178 and to the hydraulic motor 82 and the hydraulic cylinder 132 by a line 180. The solenoid valve is connected to a push button switch 179 by leads 181, and to ground by lead 183. The other side of the hydraulic cylinder 132 is connected to hydraulic motor 82 and valve 168 by a line 182. The valve 170 is connected to the hydraulic cylinder 29A for the fork lift 20 by line 184. The other side of the hydraulic lift cylinder 29A is connected to valve 176 by line 186.

The manual valve 166 is connected to the reversible hydraulic motor 116, which moves the horizontal gate 100, by a line 188. The other side of the hydraulic motor 116 is connected to valve 166 by a line 190. Line 190 is also connected to line 180 by a branch line 192 which is provided with a check valve 193.

Line 180 is also connected to the hydraulic cylinder 64 for the vertical gate by a branch line 194. The other side of the hydraulic cylinder 64 is connected to line 188 by a branch line 196.

The line 180 is also connected to line 182 by a branch line 198, which includes check valves 200 and 202 and a pressure relief valve 204. The line 188 is connected to the line 190 by a branch line 206 which includes check valves 208 and 210 and a pressure relief valve 212. Line 196 is connected to line 194 by a line 214 through the check valve 216 by a bypass line 218 and a check valve 220.

In operation of the apparatus of the invention and in practicing the method, when palletizing cans, the side rails 142 and 144 are preadjusted for the particular size can which is to be palletized by using the index holes 155 and pins 156. The horizontal gate 100 is also provided with the appropriate pattern forming element 102 which has dies of the same radius as the cans being palletized. The hydraulic pump 162 and pump motor 164 are energized (by controls not shown) and the tubular belt 66 is retracted to the position shown in FIG. 6 by manually actuating valve 168. As the belt 66 reaches its fully retracted position, the belt 66 engages and closes a limit switch 222 (FIGS. 6 and 13) which is normally open. The limit switch 222 energizes the solenoid for valve 176 to permit fluid flow to the hydraulic fork lift cylinder 29A when valve 170 is activated. The fork lift 22 can then be raised to the desired position with the upper surface 230 of a pallet 232 an inch below the tubular belt 66 when the belt 66 is in the extended position as shown in FIG. 9.

When the pallet 232 and fork lift are in the desired position, the retractable apron 66 is moved to its extended position forming a platform over the bin as shown in FIG. 9 by moving valve 168 to its first position. The horizontal gate 100 is then moved to the position shown in FIG. 9 slightly over the forward end of conveyor 30 by manually moving valve 166 to its first position to energize hydraulic motor 116. When the horizontal gate 100 reaches the rear stop 128 (FIG. 2) which determines the rearward position of the gate 100, excess pressure and volume return to the reservoir through check valve 208 and pressure relief valve 212.

When the horizontal gate 100 is in the position shown in FIG. 9 the cans to be palletized are fed onto the conveyor 30, in random, from a can filling machine or other source toward the center of the pattern forming element 102. Once the cans hit the pattern forming element 102 the mesh belt 30 slides, adjusts and shifts the cans laterally to form a forward rank of cans 106 nesting between the dies 104 and side rails 142 and 144.

The forward rank or transverse row of containers 106 initiates the formation of the second transverse row of containers as the forward movement of containers is arrested, and thus a generally honeycomb pattern of cans progressively develops as shown in FIG. 2 in the pattern forming zone 69, in which the cans other than those in contact with the rails or pattern forming element 102 are in contact with six surrounding cans. The pattern bulids up rearwardly from the pattern forming element 102 in the configuration of a pyramid as shown in FIG. 2.

When a quantity of cans equal in length to approximately twice the length of a pallet has accumulated in the pattern forming zone 69, the patterned cans can be measured into layers which are deposited on the pallet. This is accomplished by reversing the motor 116 by moving valve 166 to its second operative position to thus move the horizontal gate 100 over the retractable apron 66 to the primary stop position A, in which the piston rod of hydraulic cylinder 132 is fully extended. As the horizontal gate is moved to the A position the cans on the conveyor move in pursuit of the gate 100 under pressure of the conveyor and the cans on the conveyor to fill the apron 66 as shown in FIG. 10. The horizontal speed of the gate 100 is such that the forward rank 106 of cans remains in contact with the pattern forming element 102 to maintain the integrity of the pattern.

The valve 168 is then moved to its second operative position to energize the hydraulic cylinder 64 and lower the clamping bar 52 into engagement with the cans 230 (FIG. 10) located over the dead plate 42 to separate the measured layer from the accumulation of patterned cans on the conveyor 30 and to retain at least one transverse row of patterned cans on conveyor 30 to promote continual pattern development of cans on the conveyor 30. When the valve 168 is moved to the second position the piston of hydraulic cylinder 132 moves to the secondary stop position B shown in FIG. 11 releasing the pressure on the cans carried by the apron 66. Actuation of valve 168 to the second position also simultaneously energizes motor 82 to retract the tubular belt 66 from under the measured layer to progressively deposit the transverse rows of cans onto the pallet without disrupting the pattern as shown in FIG. 11.

When the first measured layer of patterned cans has been deposited on the upper surface 230 of a pallet 232, the pallet 232 is lowered a distance approximately equal to the height of the cans by actuating valve 170. A chipboard, separator or divider 234 is then manually placed on top of the palletized layer of cans.

The loading sequence for the next layer of cans can be initiated by returning the retractable apron 66 to the position shown in FIG. 9 by manually actuating valve 168 to its first position. The valve 166 is then moved to its first position, causing gate 100 to leave the hydraulic cylinder 132 permitting the piston rod 134 to return to the primary stop position A and causing cylinder 64 to retract, to raise the clamp bar 52 and release pressure on cans located on the dead plate 42. Valve 166 is then immediately moved to its second position, returning gate 100 to primary stop position A.

Cans are then pushed onto the apron 66 by movement of the conveyor 30 and pressure from the cans contained thereon. When the apron 66 is filled, the valve 168 is moved to its second position to bring the clamping bar 52 into engagement with the cans located over the dead plate 42 and to move the stop 134 to the secondary stop position B to release pressure on the cans and to retract the apron 66 and deposit the second measured layer of patterned cans onto the pallet 232. Thus it is apparent that the formation of a pattern is initiated on the conveyor 30 by using the pattern forming element 102, it is not necessary to return the pattern forming element 102 to a position over the conveyor when palletizing successive layers of cans. The patterned cans retained on the conveyor 30 by the clamping bar 52 define the pattern and induce patterning of containers subsequently delivered to conveyor 30. Thus the palletizing sequence can be performed in a minimum of time since a quantity of patterned cans is always available for deposition in superimposed vertical layers.

The apparatus of the invention can also be used to depalletize cans as shown in FIG. 12. When depalletizing, the pattern forming element 102 is removed from the horizontal gate or bar 100. When the tubular belt is in a retracted position as shown in FIG. 12, the valve 170 is actuated to raise the pallet and place the bottom of the first layer of cans at approximately the height of the dead plate 42 and conveyor 30. The valve 166 is then moved to its first position to move the gate 100 to sweep the layer of cans from the pallet and onto the conveyor 30 which is running in the reverse direction. The horizontal gate 100 is then retracted and the pallet is raised vertically to position another layer of cans at the level of conveyor 30. The horizontal gate 100 is then moved toward the conveyor 30 to push the cans onto the conveyor 30.

I claim:

1. Apparatus for loading cylindrical containers on a pallet comprising a frame, said frame including frame portions defining a pallet loading bin having a bin mouth, a vertically reciprocal lift in said loading bin, means for raising and lowering said lift, a conveyor supported on said frame, the forward end of said conveyor terminating adjacent one end of said loading bin, means for moving said conveyor, a pair of spaced side rails extending along said conveyor and said loading bin, means for adjustably mounting said side rails on said frame along the margins of said conveyor and along the sides of said loading bin, said means affording selective lateral adjustment of said side rails to vary the spacing between said side rails, for the formation of patterns of different size containers, a retractable apron, means for selectively moving said retractable apron from a first position enclosing said mouth of said bin and adjacent to said conveyor and a second position exposing said mouth, a horizontally reciprocal gate, means for forming a pattern of cylindrical containers, said means for forming a pattern of cylindrical containers being carried by said horizontal gate, and means for selectively moving said horizontal gate over said retractable apron between a first position over the forward end of said conveyor to initiate the formation of a pattern of containers rearwardly of the gate and on said conveyor, and a second position adjacent the forward end of said loading bin, said gate confining the forward rank of patterned containers as said gate is moved to said second position and a quantity of patterned containers are moved over said retractable apron under pressure of said conveyor; and means for separating a measured quantity of patterned containers on said retractable apron from the patterned containers remaining on said conveyor and retaining the patterned containers on said conveyor against movement as said apron is retracted to deposit the measured pattern of containers on a pallet in said loading bin.

2. Apparatus in accordance with claim 1 wherein said means for separating a measured quantity of patterned containers on said retractable apron from the patterned containers remaining on the conveyor includes a dead plate supported on said frame and located adjacent the forward end of said conveyor, a vertically reciprocal clamp located above said dead plate and means for selectively moving said clamp between positions of clamping engagement and nonclamping engagement with containers located on said dead plate.

3. Apparatus for loading cylindrical containers on a pallet comprising a frame, said frame including frame portions defining a pallet loading bin having a bin mouth, a vertically reciprocal lift in said loading bin, means for raising and lowering said lift, a conveyor supported on said frame, the forward end of said conveyor terminating adjacent one end of said loading bin, means for moving said conveyor, a pair of spaced side rails, out-turned slides on each of said side rails, longitudinally extending slots in each of said slides, out-turned brackets on said frame to support said slides, hand screws extending through said slots and threadably received in said brackets, alignment pins and index holes in said slides and said brackets and indexing indicia on said slides and said brackets to facilitate alignment of said side rails at a plurality of predetermined positions, a retractable apron, means for selectively moving said retractable apron from a first position enclosing said mouth of said bin and adjacent to said conveyor and a second position exposing said mouth, a horizontally reciprocal gate, means for forming a pattern of cylindrical containers, said means for forming a pattern of cylindrical containers being carried by said horizontal gate, and means for selectively moving said horizontal gate over said retractable apron between a first position over the forward end of said conveyor, and a second position adjacent the forward end of said loading bin.

4. Apparatus in accordance with claim 1 wherein said retractable apron comprises a plurality of spaced tubes, a pair of spaced endless chains, the ends of said tubes being rotatably connected to said chains.

5. Apparatus in accordance with claim 4, wherein said means for selectively moving said retractable apron comprises a first cross shaft, a pair of drive sprockets carried by said first cross shaft, said first cross shaft being located forwardly of said loading bin and spaced upwardly from the mouth of said loading bin, second and third cross shafts, a pair of sprockets located on each of said second and third cross shafts and in engagement with each of said chains, a fourth cross shaft located adjacent the forward end of said conveyor and the other side of said loading bin, a pair of sprockets carried by said fourth cross shaft, said sprockets being in engagement with said chains, and a reversible hydraulic motor connected to said first cross shaft, whereby energization of said hydraulic motor causes said retractable apron to be withdrawn vertically upwardly.

6. Apparatus in accordance with claim 1 wherein said means for forming a pattern of cans carried by said horizontal gate comprises a pattern forming element having a series of spaced semicylindrical dies interconnected by a web, said web being detachably secured to said horizontal gate.

7. Apparatus for loading cylindrical containers on a pallet comprising a frame, said frame including frame portions defining a pallet loading bin having a bin mouth, a vertically reciprocal lift in said loading bin, means for raising and lowering said lift, a conveyor supported on said frame, the forward end of said conveyor terminating adjacent one end of said loading bin, means for moving said conveyor, a pair of spaced side rails, means for adjustably mounting said side rails on said frame along the margins of said conveyor and along the sides of said loading bin, said adjustable mounting means affording selective lateral adjustment of said side rails to vary the spacing between said side rails, a retractable apron, means for selectively moving said retractable apron from a first position enclosing said mouth of said bin and adjacent to said conveyor and a second position exposing said mouth, a horizontally reciprocal gate, means for forming a pattern of cylindrical containers, carried by said horizontal gate, and means for selectively moving said horizontal gate over said retractable apron between a first position over the forward end of said conveyor, and a second position adjacent the forward end of said loading bin, said last named means including a pair of endless chains located on opposite sides of said bin mouth, a pair of brackets extending from said gate, said brackets being connected to said chains, each of said brackets including trolley wheels, and said frame including a track on each side of said bin mouth for guiding said trolley wheels and reversible means to drive said chains to move said horizontal gate to said first and second positions.

8. Apparatus in accordance with claim 7 including a forward stop engageable with said horizontal gate, said forward stop being actuatable to afford first and second forward stop positions, said first position determining the forward extent of the measured layer of containers carried by said retractable apron, said second position affording movement of said pattern forming element from engagement with containers on said apron to release the pressure on the containers to facilitate deposition of the containers on a pallet under said retractable apron.

9. Apparatus in accordance with claim 2 wherein said means for selectively moving said clamp between positions of clamping engagement and nonclamping engagement with containers comprises a cross frame which spans the width of said conveyor, said cross frame being connected to said frame, a cross head, means connecting said cross head to said frame to afford vertical height adjustment of said cross head, a clamping bar, a plurality of toggle linkages, each of said toggle linkages including first and second links, said first links being pivotally connected to said cross head and said second links being pivotally connected at the other end of said clamping bar, a push rod connected to the pivotal connections between said first and second links of said toggle linkages, a hydraulic cylinder having a piston rod and a link connecting said piston rod to said push rod, and means for biasing said clamping bar to a position of nonclamping engagement with containers carried by said conveyor.

10. Apparatus for loading cylindrical containers in patterned layers on a pallet and for removing containers from a pallet, said apparatus comprising a frame, a conveyor belt supported on said frame, said conveyor belt having an upper surface having a sufficiently low coefficient of friction to afford slipping and shifting of containers carried by said belt under pressure of said conveyor belt when forward movement of cans on said conveyor belt is arrested, a retractable platform located at the forward end of said conveyor, a pair of spaced side rails extending along the margins of said conveyor and said retractable platform, means for adjustably mounting said side rails on said frame, said means affording selective lateral adjustment of said side rails to vary the spacing therebetween, means cooperating with said side rails and said conveyor for initiating the formation of a predetermined pattern of containers on said conveyor, means for selectively moving said means for initiating a pattern between a first position over said forward end of said conveyor and a second position remote from said conveyor for measuring a predetermined quantity of containers on said retractable platform as patterned containers are moved onto said platform under pressure of said conveyor and means located adjacent the forward end of said conveyor and movable into engagement with containers carried on said conveyor to arrest forward movement of containers on said conveyor and separate the containers on said conveyor from the measured pattern of containers on said retractable platform, a vertically reciprocal lift adjacent the forward end of said conveyor for supporting pallets, and means for selectively moving said retractable platform between a first position adjacent the forward end of said conveyor and over a pallet carried by said lift to receive patterned containers carried by said conveyor and to a second position remote from said conveyor to expose a pallet carried by said lift and progressively deposit patterned containers from said platform on to said pallet in the predetermined pattern.

11. Apparatus for depositing containers in patterned layers on a pallet comprising a frame, a conveyor carried by said frame, a retractable platform supported on said frame, means for selectively moving said platform between a first position adjacent the forward end of said conveyor for receiving patterned containers carried by said conveyor, and a second position remote from the forward end of said conveyor, a pair of spaced side rails, means for mounting said side rails on said frame along the margins of said conveyor belt at a predetermined spacing, a horizontally reciprocal gate selectively movable over said retractable platform between a first position over the forward end of said conveyor and a second position remote from the forward end of said conveyor, pattern forming means carried by said horizontal gate, said pattern forming means cooperating with said side rails to provide a pattern forming zone for confining and arresting forward movement of containers carried by said conveyor adjacent the forward end thereof to cause lateral shifting and adjustments of containers into a predetermined pattern, under pressure by said conveyor, a clamp located adjacent the forward end of said conveyor, means for selectively moving said clamp between positions of clamping and nonclamping engagement with containers carried by said conveyor, said clamp cooperating with said horizontally reciprocal gate to measure a predetermined quantity of patterned containers carried by said conveyor and arrest movement and separate patterned containers from the measured quantity and retain a quantity of patterned containers adjacent the forward end of said conveyor to guide movement of containers into said predetermined pattern, said pattern forming means and said horizontal gate being movable to the remote position over the platform at a speed such that the forward rank of patterned containers is in continual engagement with said pattern forming means to maintain the integrity of said pattern, said horizontal gate and said pattern forming means also arresting forward movement of a measured pattern of containers in its remote position as said retractable apron is withdrawn from beneath said measured layer of said containers to deposit the measured layer of patterned containers upon a pallet located under said retractable platform.

12. Apparatus for loading containers on a pallet comprising a frame, said frame including frame portions defining a pallet loading bin having a bin mouth, a vertically reciprocal lift in said loading bin, means for raising and lowering said lift, a retractable apron, means for selectively moving said retractable apron from a first position enclosing said mouth of said bin and a second position exposing said mouth to afford deposition of containers from said retractable apron onto pallets carried by said vertically reciprocal lift upon retraction of said apron beneath containers carried by said apron, a conveyor, having an upper run extending to adjacent said loading bin, means engageable with the tops of containers to arrest forward movement of containers carried by said conveyor, a horizontally reciprocal gate carrying pattern forming means, means for moving said gate between a first position over said conveyor to initiate the formation of a pattern of containers, as containers are moved against said pattern forming means by said conveyor and a second position remote from said first position and over said retractable apron to measure a quantity of patterned containers and a third position forwardly of said second position to release pressure on the forward rank of containers on said apron when pressure of the conveyor on the measured pattern of containers is interrupted by actuation of said means engageable with the tops of containers to arrest forward movement of containers and prior to retraction of said retractable apron from beneath said measured quantity of containers on said apron.

UNITED STATES PATENT OFFICE
CERTIFICATE OF CORRECTION

Patent No. 3,570,685                              Dated March 16, 1971

Inventor(s)  Kenneth G. Carlson

It is certified that error appears in the above-identified patent and that said Letters Patent are hereby corrected as shown below:

Column 1, line 21, "of" should read -- for --. Column 3, line 47, "20" should read -- 30 --. Column 7, line 29, "that the" should read -- that once the --.

Signed and sealed this 16th day of November 1971.

(SEAL)
Attest:

EDWARD M. FLETCHER, JR.           ROBERT GOTTSCHALK
Attesting Officer                 Acting Commissioner of Pat